Sept. 9, 1969   J. E. BROOK   3,466,523
ELECTRIC MOTOR CONTROL CIRCUIT
Filed Feb. 23, 1967   2 Sheets-Sheet 2

United States Patent Office 3,466,523
Patented Sept. 9, 1969

3,466,523
ELECTRIC MOTOR CONTROL CIRCUIT
John Edwin Brook, 7 Pier St., Lee-on-Solent, England
Filed Feb. 23, 1967, Ser. No. 618,080
Claims priority, application Great Britain, May 17, 1966,
21,962/66
Int. Cl. H02p 5/04; H02k 27/20
U.S. Cl. 318—332                                    10 Claims

ABSTRACT OF THE DISCLOSURE

A control circuit for an electric motor. The circuit has means for obtaining a series of regular pulses, means for obtaining a continuous supply voltage, and combining means for combining the supply voltage and the pulses in an adjustable manner to give a combined voltage. The combined voltage comprises a pulse component and a continuous component, the magnitudes and relative proportions of which components are adjustable by adjustable means in the combining means. Output means is provided to which the combined voltage is applied, the output means deriving an output voltage for driving the motor corresponding to at least part of the combined voltage.

---

This invention relates to a control circuit for an electric motor.

According to the invention a control circuit for an electric motor comprises means for obtaining a series of regular pulses, means for obtaining a continuous supply voltage, combining means for combining the supply voltage and the pulses in an adjustable manner to give a combined voltage which comprises a pulse component and a continuous component, the magnitudes and relative proportions of which components are adjustable by adjustable means in the combining means, and output means to which the combined voltage is applied, the output means deriving an output voltage for driving the motor corresponding to at least part of the combined voltage.

Preferably there is a range of control in which the overall amplitude of the output voltage is constant, being the level of regular output voltage pulses, and control is effective to adjust the level of a voltage present between the pulses. There is preferably a further range of control in which there is no voltage present between the output pulses and control is effective to adjust the level of the output pulses.

In a modification of the control circuit means is provided for automatically varying the output in accordance with the speed and/or load conditions of the motor. In such cases the amplitude of the combined output voltage will be varied for example in such manner that an increase in load or a decrease in speed or both will produce an instantaneous increase in the output to the motor and vice versa without any adjustment of the control.

It is found that such arrangements give good starting torque for the motor and very smooth control of speed and power at all loadings.

In one embodiment of the invention mains supply is transformed down to a suitable voltage and applied to a full-wave rectifier and smoothing capacitor, the output of which is applied across a variable potentiometer to give the continuous supply voltage. The pulses are derived from an input terminal of the recitfier and by the action of a diode square wave pulses of mains are superimposed on the continuous voltage. The wiper of the potentiometer is connected to the input of the two-stage transistorised amplifier which has an emitter follower output stage to give a low impedance to feed the motor. Conveniently there is a reversing switch provided in the output. Feedback control is conveniently achieved by an emitter load in the first transistor stage which is arranged to take the motor current or a proportion thereof, the transistor being therefore biassed thereby.

The invention will further be described with reference to the accompanying drawings, in which.

Figure 1:
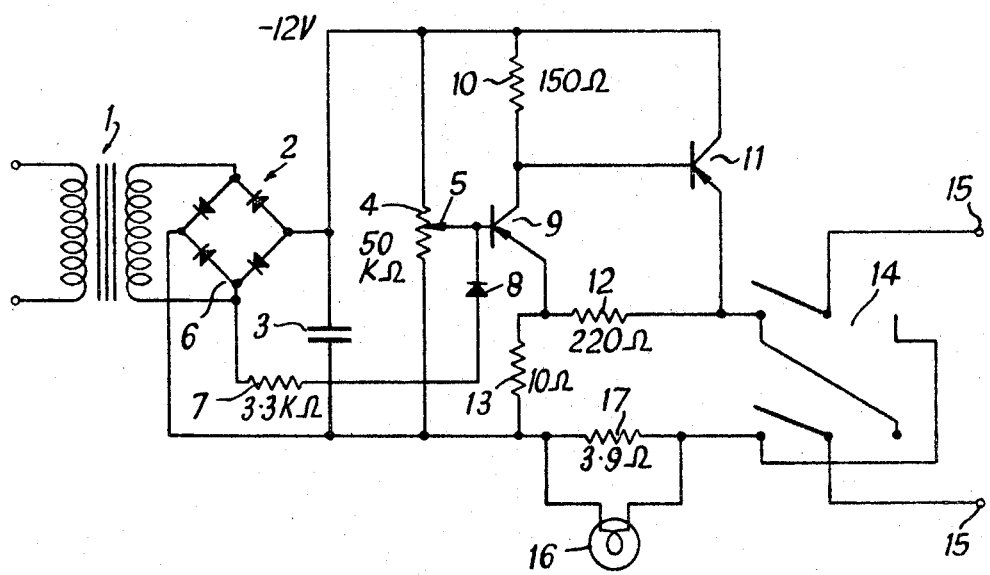
FIGURE 1 is a circuit diagram of one embodiment of the invention.

Referring to FIGURE 1, the circuit is for supplying a twelve volt D.C. motor with variable input voltage. The input to the circuit is derived from 230 volts 50 c.p.s. mains by a step-down transformer 1 which gives across its secondary an output of 16 volts R.M.S. This output is applied to a full-wave rectifier 2, the output from which is applied across a smoothing capacitor 3 which in turn is connected across a variable potentiometer 4 having a wiper 5.

A pulse output is derived from rectifier 2 by taking output from an input terminal 6 of the rectifier and applying it through a resistor 7 to a diode 8 and thence to the wiper 5 of the potentiometer 4.

The wiper of the potentiometer is connected directly to the base of a transistor 9 which is connected as an amplifier stage and derives an output across a load resistor 10. This output is applied to the base of a further transistor 11 which is connected in emitter follower form, the emitter resistance being constituted by a resistor 12 and a low-value resistor 13 which is common to the emitter circuits of transistors 9 and 11. The output from the circuit is taken from across the emitter load of transistor 11 through a reversing and isolating switch 14 to terminals 15 which are for connection to the input terminals of the motor to be controlled. A pilot light 16 is connected across a resistor 17 in the output circuit to the motor to show when the motor is taking current.

Figure 2:
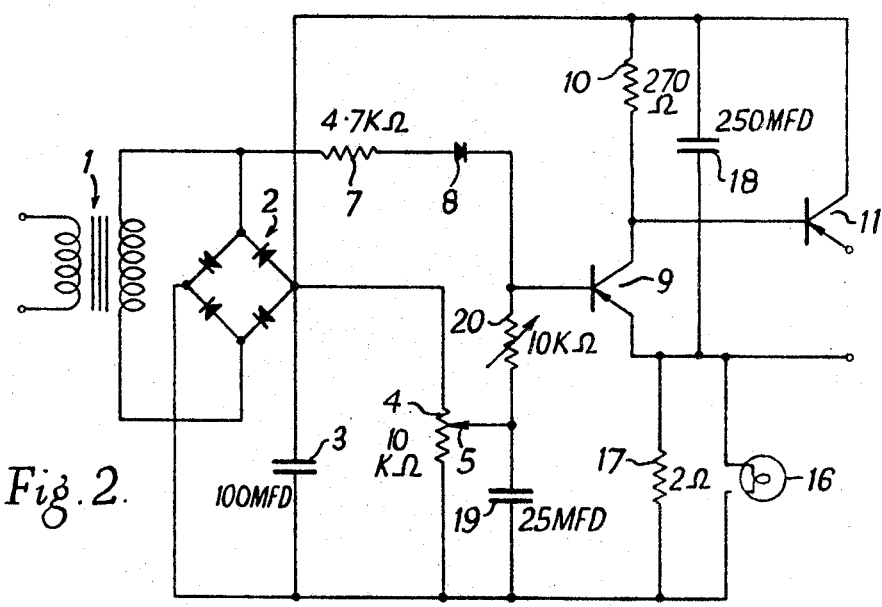
FIGURE 2 is a circuit diagram of another embodiment of the invention.

In the embodiment of FIGURE 2 which is generally the same as that of FIGURE 1, the resistors 12 and 13 of FIGURE 1 are omitted and the emitter resistance of transistor 11 is constituted by the load (the motor) and the low value resistor 17 which latter is now also connected in the emitter circuit of transistor 9. With this modification changes in potential drop across the resistor 17 produced by variation of motor current due to changes in load change the bias on transistor 9 so as to produce a compensating change in output voltage to the motor.

Furthermore, there are provided capacitors 18 and 19 which are effective to smooth out short period pulse height variations at low power output settings. A further refinement is the provision of an adjustable resistor 20 between the diode 8 and wiper 5.

Figure 3:
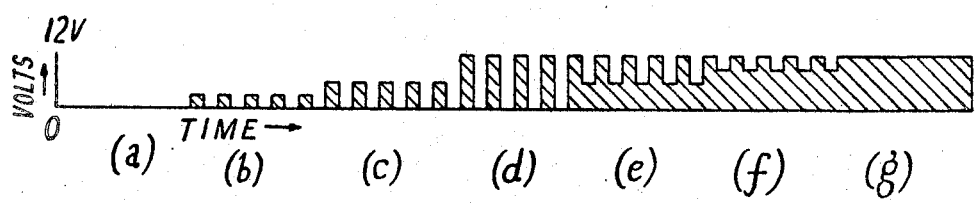
FIGURE 3 is a waveform diagram illustrating the output at various settings of the potentiometer control of the circuit of FIGURES 1 and 2.

Both circuits operate by superimposing the pulse waveform derived from diode 8 on to the continuous supply voltage derived from potentiometer 4. Variation of the position of wiper 5 from the uppermost position (in the drawing) to the lowermost position on potentiometer 4 varies the output voltage appearing at terminals 15 in a manner which is indicated in FIGURE 3. Referring to FIGURE 3, there is illustrated at (a) to (g) seven successive stages in the increase of input voltage to the motor assuming the load is constant. These stages correspond to the gradual movement of wiper 5 of potentiometer 4 from the upper end (in FIGURES 1 and 2) to the lower end. It will be seen that initially the pulses, of width 10 m.sec. and spacing 10 m.sec. appear in increasing amplitude until the maximum amplitude determined by the circuit (12 volts) is obtained. Thereafter, further increase causes the appearance of the continuous voltage which rises from zero to 12 volts and is superimposed on the pulses, appearing as a voltage level between the pulses. The circuit parameters determine the maximum output level to be 12 volts and after the maximum level has been reached by the pulses further downward movement of the potentiometer wiper has the effect of increasing the proportion of the continuous voltage relative to the pulses. In FIGURE 3(g) there is shown the final stage of control in which the motor is supplied with the full voltage shown constituted by the continuous voltage alone at 12 volts.

The mechanism whereby the output shown in FIGURE 3 is obtained may be understood from the following. Considering firstly the FIGURE 1 arrangement, a steady voltage of 12 volts is developed across the potentiometer 4, between the upper, negative, line and lower, ground, line. The diodes of bridge 2 conduct alternately in pairs in known manner, so that each of the two input terminals of the bridge assumes zero (ground) potential and −12 volts alternately at the frequency of the mains supply. This square wave voltage is applied through resistor 7 to diode 8.

Since the wiper of potentiometer 5 is generally at a potential between zero and −12 volts there is a tendency for the diode alternately to conduct (when resistor 7 is effectively grounded) and cut off (when resistor 7 is effectively connected to the negative line). When the diode 8 is cut off the potential applied to the base of transistor 9 is the basic potential of the wiper which is dependent only upon the position of the wiper on the potentiometer. When the diode 8 is conducting the potential applied to the base of transistor 9 is a combined voltage resulting from zero volts received from a source impedance effectively that of resistor 7 and the basic potential of the wiper (which depends on the wiper setting) received from a source impedance depending on the wiper setting. The relative effects of the two voltages on the combined voltage depends inversely on their relative source impedances. This means that at the ends of the wiper movement the effect of the basic wiper potential is relatively large whereas in the center region of the wiper movement the effect of the potential from the diode is relatively large.

As was mentioned above, the arrangement of FIGURE 2 is slightly different from that of FIGURE 1. Resistor 7 is connected to the other input terminal of the bridge, but this makes no practical difference. The value of this resistor is larger, but compensation is achieved in the relative source impedances by including the variable resistor 20. This further allows a reduction in the impedance of potentiometer 4 and the provision of smoothing capacitor 19. Suitable setting of resistor 20 gives substantially the same combined voltage characteristics as for the FIGURE 1 arrangement.

The component values indicated in the drawings are not in any way limiting but are shown by way of illustration as being typical values.

I claim:

1. A control circuit for an electric motor comprising means for obtaining a series of regular pulses, means for obtaining a continuous supply voltage, combining means to which said regular pulse means and said continuous supply voltage means are coupled for combining the supply voltage and the pulses in an adjustable manner to give a combined voltage which comprises a pulse component and a continuous component, said combining means including adjusting means for adjusting the magnitudes and relative proportions of said components, and output means coupled to said combining means to which the combined voltage is applied, the output means deriving an output voltage for driving the motor corresponding to at least part of the combined voltage.

2. A control circuit as claimed in claim 1 wherein the combining means comprises a variable potentiometer across which the supply voltage is applied and to the wiper of which is connected a diode, said pulses being applied to the electrode of the diode remote from the wiper.

3. A control circuit as claimed in claim 2 further including a capacitor connected between the wiper of the potentiometer and one of its terminals and a resistor connected in series between the diode and the wiper.

4. A control circuit as claimed in claim 2 wherein the continuously supply voltage means comprises a full-wave bridge rectifier and the regular pulse means comprises a circuit connection extending from one of the bridge input terminals and said diode, a resistance being provided in series between the diode and said input terminal.

5. A control circuit as claimed in claim 1 wherein the output means comprises a transistor having an input electrode to which said combined voltage is applied.

6. A control circuit as claimed in claim 5 wherein the output means comprises a further transistor connected in emitter-follower configuration with the motor in the emitter circuit thereof, the base of the further transistor being connected to receive the output from the first-mentioned transistor.

7. A control circuit as claimed in claim 1 further including feedback means for automatically varying the output voltage in accordance with the load conditions of the motor.

8. A control circuit as claimed in claim 7 wherein the feedback means is responsive to the current drawn by the motor and is arranged to compensate for changes in running conditions by affecting the control circuit output.

9. A control circuit as claimed in claim 8 wherein the aforesaid output means comprises a transistor to the base of which is applied the combined voltage, the feedback means comprising a feedback resistor in the emitter circuit of the transistor, through which resistor is passed at least a proportion of the motor current.

10. A control circuit as claimed in claim 9 wherein a capacitor is provided to by-pass to alternating current the feedback resistor.

References Cited

UNITED STATES PATENTS 3,171,968  3/1965  Sanborn _____ 318—344 X
3,309,596  3/1967  Limley _____ 318—331

ORIS L. RADER, Primary Examiner
ROBERT J. HICKEY, Assistant Examiner

U.S. Cl. X.R.

318—345; 321—8